United States Patent [19]

Bowman

[11] 4,314,545
[45] Feb. 9, 1982

[54] SOLAR HOT WATER GENERATOR

[76] Inventor: Charles W. Bowman, 1445 Bristol Pike, Morrisville, Pa. 19067

[21] Appl. No.: 36,820

[22] Filed: May 9, 1979

[51] Int. Cl.³ .............................................. F24J 3/02
[52] U.S. Cl. ................................... 126/424; 126/437; 126/446; 126/450
[58] Field of Search .............. 126/438, 441, 446, 424, 126/437, 425, 450

[56] References Cited
U.S. PATENT DOCUMENTS

| | | | |
|---|---|---|---|
| 3,916,871 | 11/1975 | Estes | 126/450 |
| 4,180,055 | 12/1979 | Hudnall | 126/446 |
| 4,185,615 | 1/1980 | Bottum | 126/424 |
| 4,186,726 | 2/1980 | Spencer | 126/423 |
| 4,193,543 | 3/1980 | Viesturs | 126/430 |

Primary Examiner—Samuel Scott
Assistant Examiner—G. Anderson
Attorney, Agent, or Firm—Richard C. Woodbridge

[57] ABSTRACT

A solar hot water generating system is disclosed which comprises a vertically pivotable heat exchanger automatically pivotable by means of a timer-actuated electric motor. The heat exchanger is fluidly connected to an insulated storage tank which retains the thermal values of the heated fluid. The system is adapted to provide hot water for domestic and industrial uses, such as heating, air conditioning, and the generation of electricity by operation of a turbine.

9 Claims, 17 Drawing Figures

SOLAR HOT WATER GENERATOR

The present invention relates to a solar hot water generator system that will produce more hot water efficiently for domestic and commercial use than any in existence today.

A device comprising of a plate glass top or a clear plastic top, a hot water generator core with two tanks contained in the device and a mirror reflecting bottom.

Still further a thermos tank (not to be confused with a regular fiberglass lined hot water tank) that will be more fully described and claimed.

A water gravity direction system that is controlled from the thermos tank to the generator core by an innovating valve system and a hot water hook up from the thermos tank to a domestic or commercial use that will be more fully described and claimed.

A solar thermocline condition created by the solar hot water generator system that would be used in producing electricity that will be more fully described and claimed.

A system that preheats water for electric power plants that will be more fully described and claimed.

In the accompanying drawing:

Note: The type of hot water generating core shown here is the type where water flows back and forth through the generating core in the parallel tubing. Also, looking at two cold water return tubes that will be explained later.

FIG. 10 is a sectional view showing the electrical connection from the solar tracking multiple unit switch to the electric motor which has a reduction gear built in.

Note: These are just a few positions, more positions can be had by putting more switch plates in timer and solar tracking multiple unit switch.

Note: In FIGS. 16 and 17 multiple solar hot water generators can be hooked in series creating hot water that will reach very high degrees of temperature at the exhausted end to supply needs.

Note: Also, on large units of hot water generator, an electric powered hydraulic system should be used in place of threaded shaft as shown in FIG. 1, numeral 14. Any suitable hydraulic unit will work in place of threaded shaft as shown in FIG. 1, numeral 14.

DESCRIPTIONS

Referring back to FIG. 1, numeral 1 shows a sun ray shining down through glass or clear plastic reflecting off of mirror or reflecting bottom, up and underneath heat collector plate and tubing. Numeral 2 is a semi-circular molded glass or clear plastic top where water generated storage tanks are placed in solar hot water generating device. Numeral 3 is the plate glass or clear plastic top that covers the hot water generating core.

Figure 1:
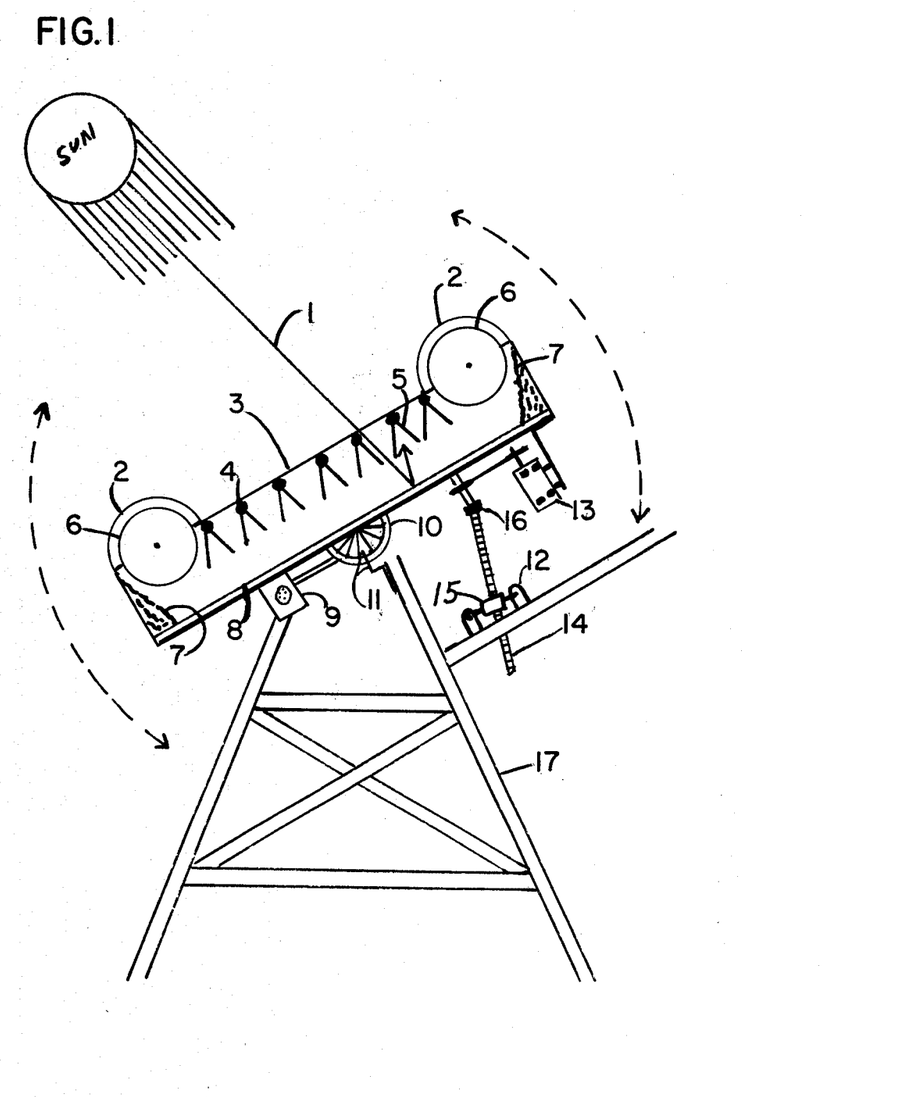
FIG. 1 is a sectional view showing the sun shining down on solar hot water generating device.

Numeral 4 is a tube and in conjunction with numeral 5 makes up the hot water generating core. Numeral 5 is a heat collecting plate. Numeral 6 shows where the hot water generating storage tanks are located in device. Numeral 7 shows the side of housing where aluminum foil and insulation is placed in and around the inside of solar hot water generating device. (In place of aluminum foil any reflecting material could be used, including a mirror, etc.) Numeral 8 shows the location of the mirror or reflecting bottom in device. Numeral 9 is an electric timer that is wired into the solar tracking multiple unit switch. Numeral 10 pointing to said switch. Numeral 11 is a stationary metal spring strip which is part of switch making complete circuit to solar tracking multiple unit switch to electric motor at numeral 13. Numeral 12 is a bracket mounted on to A-frame stand that works threaded female design plate that swivels inside bracket allowing it to change position in conjunction with numeral 15. Numeral 14 is a threaded shaft that goes through female threaded housing (numeral 15) up to numeral 16. Numeral 15 is a female threaded design plate with pins on each side that fit in numeral 12 bracket. Numeral 16 is a universal joint or a ball socket joint allowing threaded shaft (numeral 14) to be movable. Numeral 17 is part of A-frame mount that solar hot water generator is mounted on.

Figure 2:
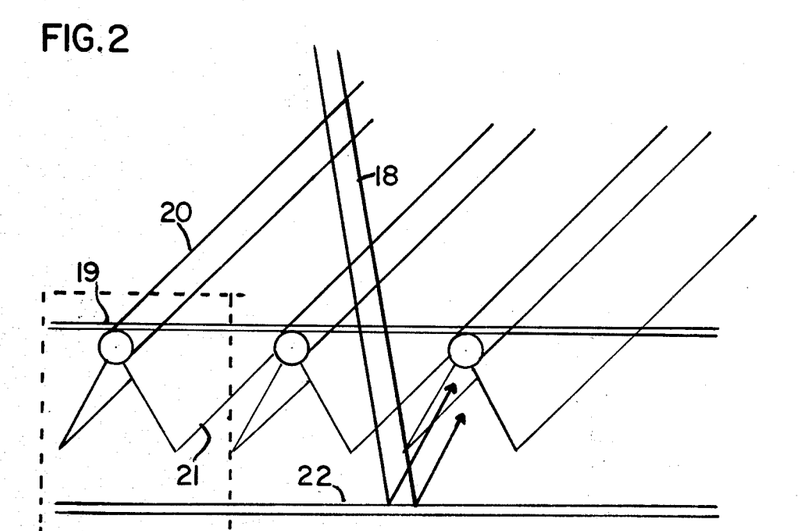
FIG. 2 is an enlarged sectional view of the plate glass or clear plastic top of device, also showing mirror bottom or reflecting bottom of generator core housing, tubing and heat collector plates molded, soldered or welded to tubing with sun rays shining down through top reflecting off of reflected bottom up underneath generator tubing and collector plates causing hot water generator to heat faster due to the fact heat always travels upward causing a more penetrating condition.

Referring back to FIG. 2, numeral 18 shows an enlarged sun ray shining down through transparent top, numeral 19, to bottom of housing reflecting off of mirror or reflecting bottom up under hot water generator core. Numeral 20 is a tube and numeral 21 is a heat collector plate, numerals 20 and 21 make up the generator core. Numeral 22 is the mirror bottom or reflected bottom of solar hot water generator.

Figure 6:
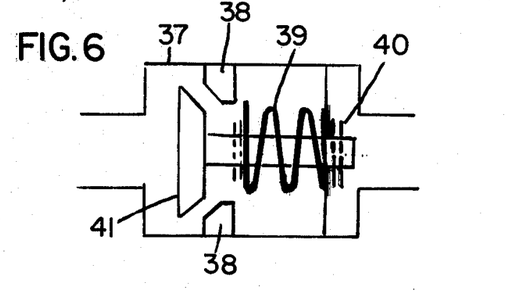
FIG. 6 is a valve designed to let water pass through under a gravitational circulating condition. However, when water is discharged by opening a faucet, etc., it will create a low pressure on spring side of the valve causing a higher pressure of water on valve head side causing valve to close stopping cold water from mixing with hot water. This type of valve is used throughout the system and will be explained more fully.
Figures 12, 13:
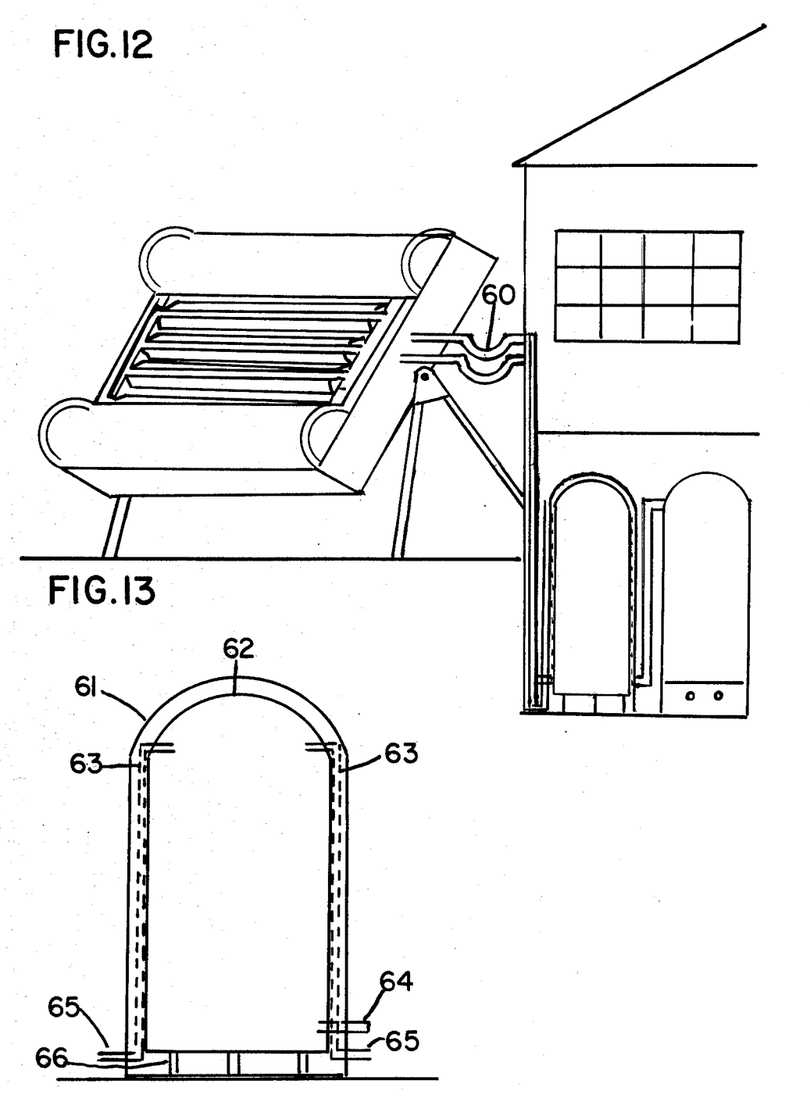
FIG. 12 shows solar hot water generating device with tanks, water being discharged from same into thermos tank in basement of dwelling hooked ito dwelling's regular hot water system.
FIG. 13 shows an enlarged view of the thermos tank that is used in solar hot water generating system to be explained more fully.

Referring back to FIG. 3, numeral 23 shows hot water storage tank. Numeral 24 is a design valve that is shown in FIG. 6. Numeral 25 shows generator tubing and heat collector plates attached. Numeral 26 shows cold water return from top tank to bottom tank and this depends on which line is the cold water return, depending on which side is up—a.m. or p.m.

Figure 3:
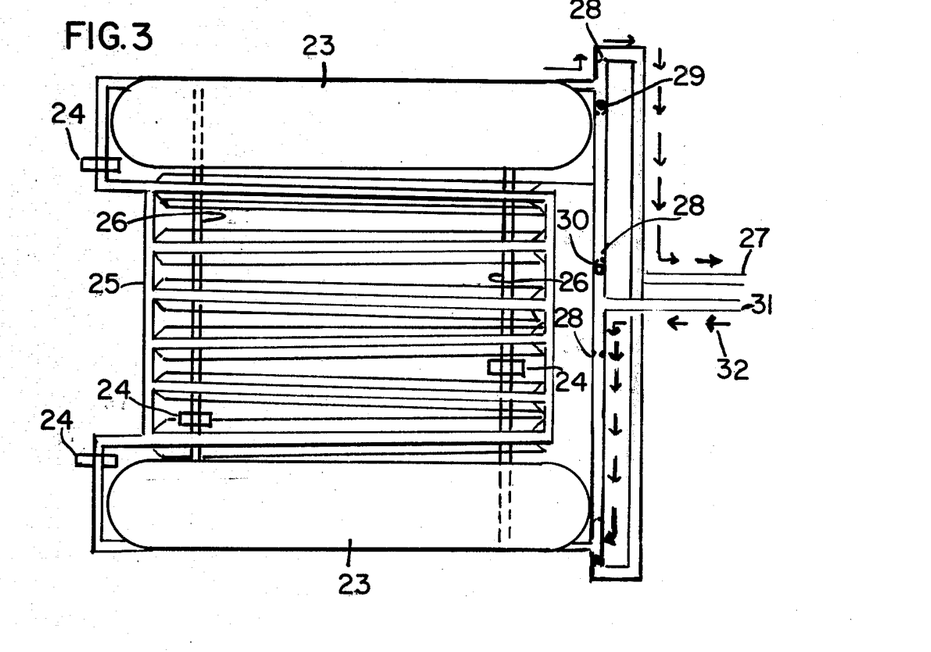
FIG. 3 is a top view looking down on tanks, generator core, automatic water valves and a water tube valve system that connects to the hot water generating tanks for water intake and discharge.

Note: This cold water line return is installed outside of the inside solar hot water generator and should be kept away from the solar created heat inside the housing. The reason this is done is so water will circulate more freely from bottom of top tank to bottom of tank that would be on the bottom. Numeral 27 is where the hot water is discharged into a thermos tank which is shown in FIG. 13. Numeral 28 is a ground valve seat in tubing. Numeral 29 is a solid metal or rubber ball which is heavier than water when that side of the solar hot water generator is up, gravity pulls this ball down to ground seat which opens water passage letting hot water flow in the direction of arrows when water is being used.

Note: Bear in mind that the solar hot water generating device while tracking the sun across the sky, the tank that is at the bottom in the a.m. becomes the top tank in the p.m.—the whole ball valve system reverses itself in the water intake and exhaust side of the solar hot water generator. Numeral 30 shows the location of ball valve said ball valve being lighter than water. Numeral 31 is where the cold water source is connected to the solar hot water generator. Numeral 32 pointing to arrow which shows the direction of the water going into system and out of system.

Figure 4:
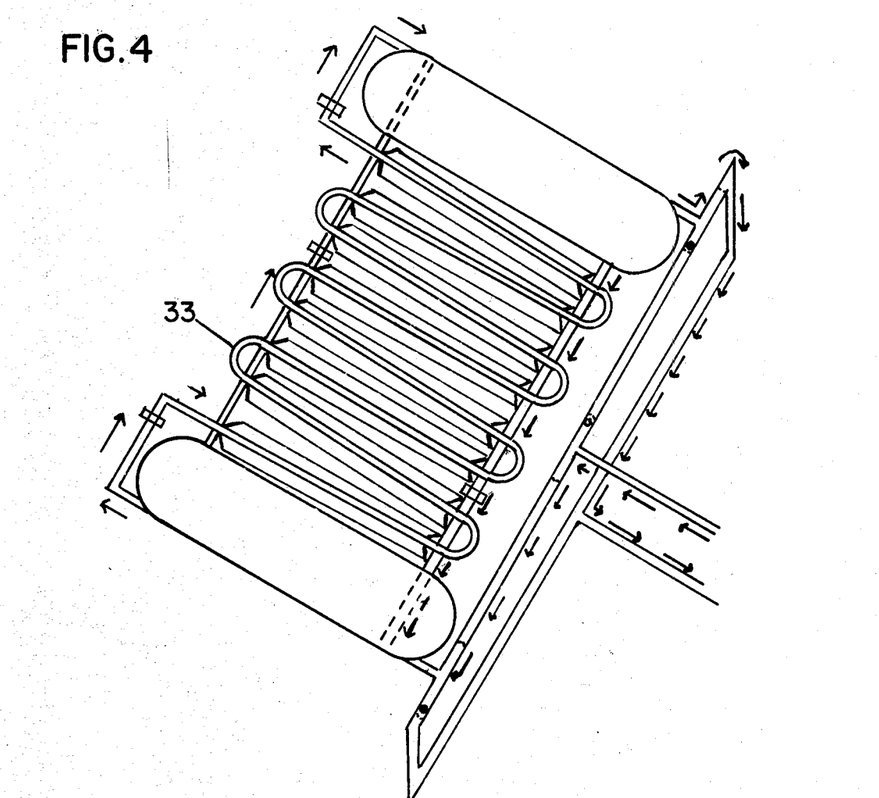
FIG. 4 is a top view showing the same as FIG. 3 with a different type core that snakes back and forth between the two storage tanks, being one continuous tube.

Referring back to FIG. 4—in most part this is the same as FIG. 3, except that numeral 33, the generator core, is one continuous tubing snaking back and forth between the two hot water storage tanks.

Figure 5:
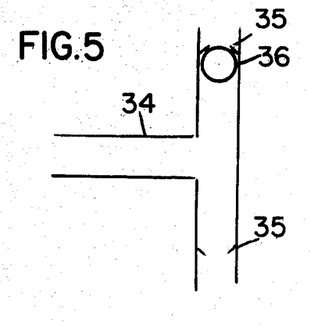
FIG. 5 is an enlarged sectional view, showing two ground valve seats and a floating ball valve that shuts the tubing off causing the flow of cold water to be directed to the bottom tank depending on position of the generator at the time of day—a.m. or p.m.—ball will always float to the top up against valve seat in tubing shutting off cold water from mixing with the discharge of hot water when opening faucet. The same constructed valve is also used with a metal ball that is heavier than water in same valve system causing the direction of cold water into whatever tank is at bottom depending on time of day, also directing the hot water from top tank to top of thermos tank as illustrated and obviously seen in FIGS. 3 and 4.

Referring back to FIG. 5, numeral 34 shows enlarged drawing of tubing shaped like a T. Numeral 35 is a ground valve seat placed inside of tubing running at a 90° angle from numeral 34 tube. Numeral 36 shows floating ball valve that changes positions when generator is reversed.

Referring back to FIG. 6—this is a spring loaded valve that is used in hot water system at specific points. Numeral 37 shows housing of spring valve. Numeral 38 shows ground valve seat. Numeral 39 shows spring. Numeral 40 shows pin with spring retainer washer that holds spring in place on valve stem. Numeral 41 is valve head that closes when a force of water is applied.

Referring back to FIG. 7—this is solar hot water generator core comprising one continuous tube that snakes back and forth from intake to exhaust. Numeral 42 showing valve system with ball valve. Numeral 43 showing valve system with floating ball valve, the whole valve system being typical of valve system that was previously explained. Numeral 44 shows exhaust tube when this end is in an up position. Numeral 45 tube is connected to the water source. Numeral 46 shows arrow direction of water flow. Numeral 47, broken arrows, shows direction of water flow when solar hot water generator reverses itself.

Figure 7:
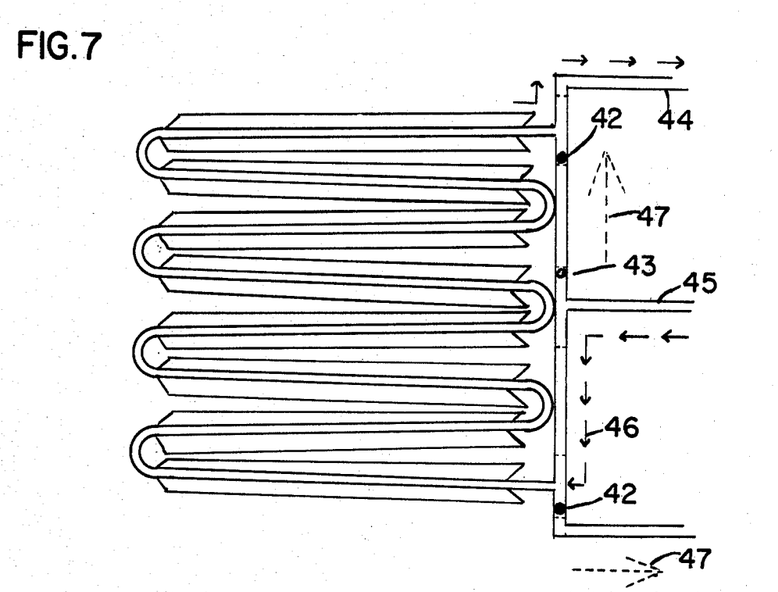
FIG. 7 is a hot water generator core without hot water storage tanks with a valve system from the incoming cold water source and the discharge of hot water. This again is the one continuous piece of tubing that is snaked back and forth making up the hot water core.
Figure 8:
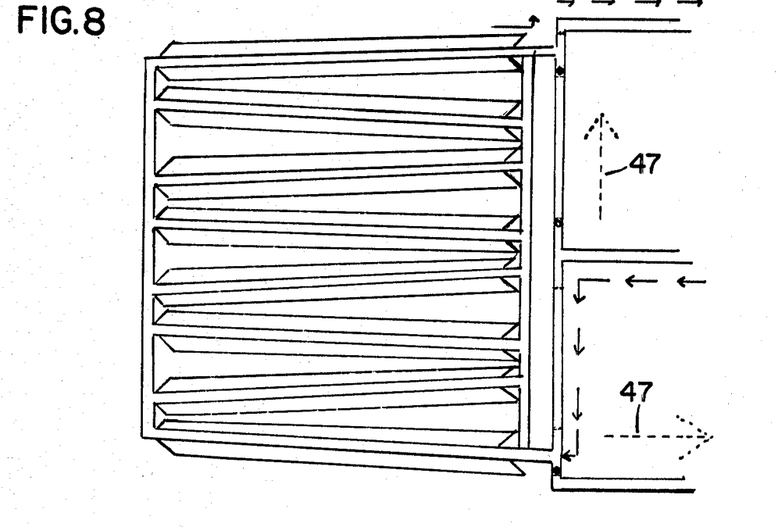
FIG. 8 is a top view looking down on solar hot water generator core that water can flow back and forth in the tubing. The tube and valve connection to core is the same as FIG. 7.

Referring back to FIG. 8—this is very typical of generator core in FIG. 7 except the water can flow back and forth when making its way to top of core.

Referring back to FIG. 9—this shows an electrical sun tracking device. Numeral 48 shows location of electrical timer. Numeral 49 shows the electrical wire connection between timer and the reverse copper plate track in solar tracking multiple unit switch that reverses the rotation in the electric motor, numeral 53, to a morning starting position. Numeral 50 shows one of the electric conducting wires from timer to solar tracking multiple unit switch. Numerals 1, 2, 3, 4 and 5 will be described as follows: numerals 1 conducting wire from timer to multiple switch will cause solar hot water generator to move from an 8:00 a.m. to a 10:00 a.m. position. Numerals 2 will cause solar hot water generator to move from a 10:00 a.m. to a 12:00 p.m. position. Numerals 3 will cause solar hot water generator to move from a 12:00 p.m. position to a 2:00 p.m. position. Numerals 4 will cause solar hot water generator to move from a 2:00 p.m. position to a 4:00 p.m. position. Numerals 5 will cause solar hot water generator to move from a 4:00 p.m. position to a 6:00 p.m. position. Numeral 51 shows reverse copper plate in solar tracking multiple unit switch. Numeral 52 shows one of the copper plates that cause solar hot water generator to track the sun. Numeral 53 is location of electric motor.

Figure 9:
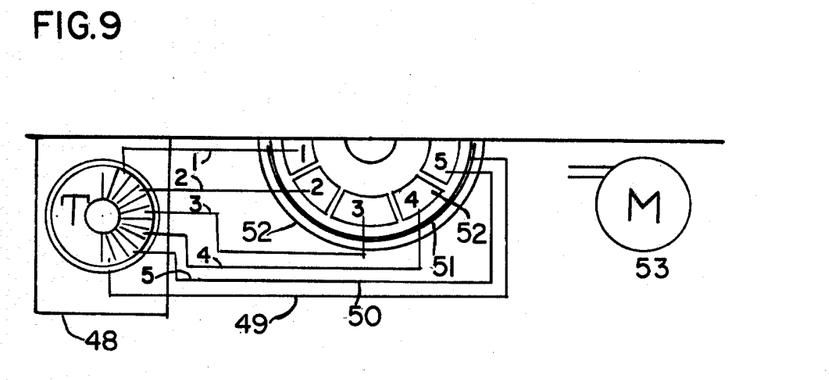
FIG. 9 is a sectional view showing the electrical connection from the timer to the solar tracking multiple unit switch (STMUS).

Referring back to FIG. 10, numeral 54 shows mounting bracket that has stationary spring metal strips mounted on it. Numeral 55 shows a spring metal strip that makes contact with metal strips that are shown in FIG. 9 at numeral 52. Numeral 56 is also a spring metal strip that makes contact with solar tracking multiple unit switch at reverse metal track in solar tracking multiple unit switch at numeral 51. When timer reaches a certain time that it is set for, in this case for example, 6:00 p.m., timer will complete the circuit to electric motor reversing said motor and moves solar hot water generator back to its first morning position to start tracking the sun again. Numeral 57 shows electric conducting wire from reverse switch to electric motor.

Figure 10:
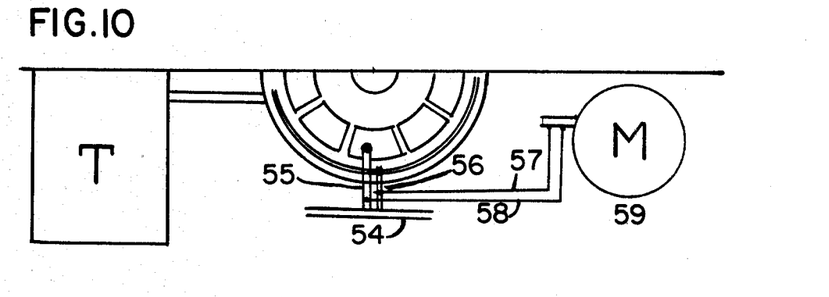

Numeral 58 shows electric conducting wire from solar tracking multiple unit switch to electric motor causing electric current to flow into motor moving the solar hot water generator to track the sun. Numeral 59 is an electric motor.

Figure 11:
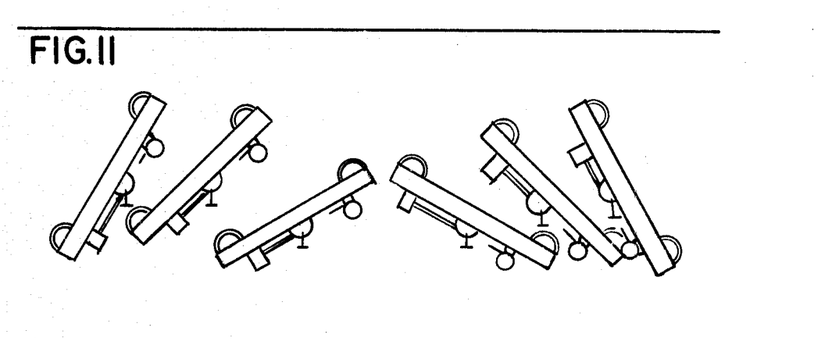
FIG. 11 is a sectional view showing hot water solar device in the various positions throughout the day as it tracks the sun.

Referring back to FIG. 11, which explains itself, shows the various positions of solar hot water generator throughout the day.

Referring back to FIG. 12—everything has been previously explained except for the flexible hose at numeral 60. Numeral 60 is flexible hoses which are connected between the solar hot water generator to the hot water exhaust and the cold water intake allowing solar hot water generator to track the sun.

Referring back to FIG. 13—this is a thermos tank that works in most part like a thermos bottle that we use every day to put coffee or hot tea in which I will describe. Numeral 61 is the outside casing which is constructed in an air tight manner, which makes up the outer tank. Numeral 62 shows the inner tank. Between the outer tank and inner tank is a vacuum space, all air is pumped out. Numeral 63 shows the plumbing, the water tubes are connected to inner tank at various spots not touching outer tank, this is so heat will not escape through to outer tank. Numeral 64 shows pressure relief valve installed at bottom of tank due to the fact that cold air travels down not up. Numeral 65 shows intake and exhaust at bottom of tank, being installed here for the same reason that the pressure relief valve, numeral 64, is installed at bottom of tank. Numeral 66 shows inner tank supports which are welded to inner and outer tank.

Referring back to FIG. 14—this has been previously explained in most part, however, I will explain the valve system. Numeral 67 is a conventional valve, also 68, 69 and 70. The valve at numeral 67 is put in an open position in the summer time. The valve at numeral 68 is also put in an open position in the summer time. The valve at numeral 69 is put in a closed position in the summer time. The valve at numeral 70 is a valve in between the water source in the solar hot water system, it is left open at all times, except for repairs. Numeral 71 shows direction of water circulating by gravity in generator and the water flow coming in to regular hot water tank that is in dwelling. Numeral 72 shows tubing protruding to bottom of tank near the thermostat control in regular hot water tank. When it is cloudy or rainy weather and generator is not producing solar hot water, dwelling regular system takes over. However, when the solar hot water generator is producing hot water, hot water flowing from thermos tank into regular hot water system will keep regular system from coming on, thus working automatically.

Figure 15:
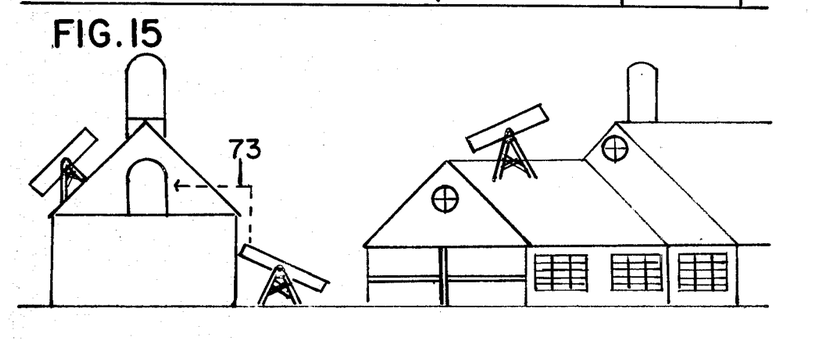
FIG. 15 shows the various positions that solar hot water generating device and thermos tank may be installed on various shaped dwellings, etc.

Referring back to FIG. 15—this shows some of the ways that solar hot water generator and thermos tank can be installed at various slopes and places on dwellings, etc. Numeral 73 shows hot water generator at ground level and thermos tank inside attic of dwelling.

Referring back to FIG. 16, numeral 74 shows a large solar hot water generator that can be hooked in series with other solar hot water generators creating a high temperature of hot water that is exhausted into a fossil fired hot water tank or boiler that is thermostatically controlled at numeral 76. Numeral 75 will always keep hot water in thermos tank when there is cloudy weather and the sun is not shining for several days when water temperature drops in line coming from solar hot water generator, a second thermostat that is installed in hot water tank at numeral 75 will cause gas or oil fired burner to come on. Water circulates by gravity between thermos tank and hot water tank at numeral 75.

Figure 14:
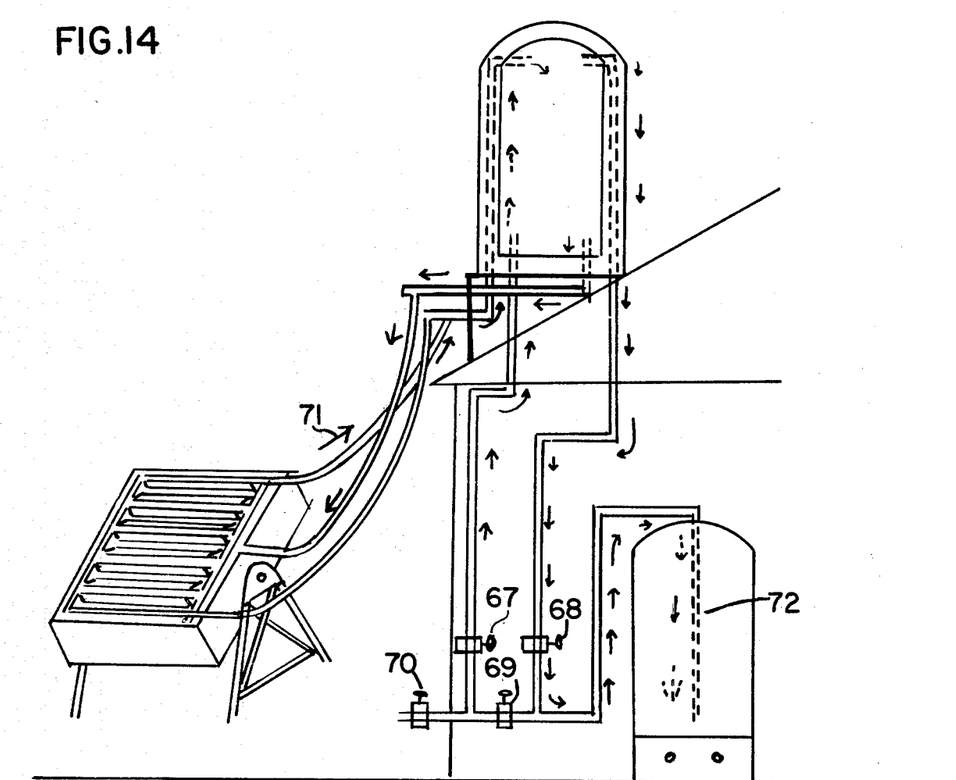
FIG. 14 shows a hot water generating device with water being circulated by gravity causing hot water thermos tank to be filled with hot water due to the circulation thereof. Thermos tank also being hooked to the regular hot water system in dwelling.

Note: FIG. 14 has the same circulating system, which you can see is not shown in FIG. 16 at numerals 75 and 76 due to the drawing being too small. Numeral 76 is the thermos tank showing a line coming out at bottom to top of vacuum tank at numeral 77. Numeral 77 is a vacuum tank that is divided in half, the top of vacuum tank being hot and the bottom of vacuum tank being cold. Referring back to line coming into vacuum tank from thermos tank when hot water is released in top of vacuum tank it turns to steam due to low pressure driving a turbine that is located at numeral 78. Turbine which is connected to shaft turns electric generator, numeral 80. When steam passes into bottom part of vacuum tank a cold coil at numeral 81 causes steam to condense back into liquid from draining out bottom of tank at numeral 82. Numeral 78 shows steam turbine. Numeral 79 shows shaft connected in between turbine and electric generator. Numeral 80 shows generator. Numeral 81 shows cold water coil inside of vacuum tank. Numeral 82 shows condensed water exhaust. Numeral 83 shows condensed water in tank. Numeral 84 shows condensation at upper part of bottom of tank.

Referring back to FIG. 17, numeral 85 showing large solar hot water generating device that can be hooked in series with other hot water generating devices. Numeral 86 is the hot water exhaust from generator to small boiler that is fossil fired when conditions warrant it. Small boiler fossil fired at numerall 88 works in the same manner as small boiler at numeral 75 in FIG. 16 in conjunction with the thermos tank. Referring back, numeral 87 is connected to the water source. Numeral 89 is the thermos tank. Numeral 90 is a steam boiler of the tubular type. Numeral 91 is a fossil fired gas or oil burner that brings temperature of water or steam up to the point where it drives turbine at numeral 92 and turns generator at numeral 93. Numeral 92 is the turbine. Numeral 93 is the electric generator.

Figures 16, 17:
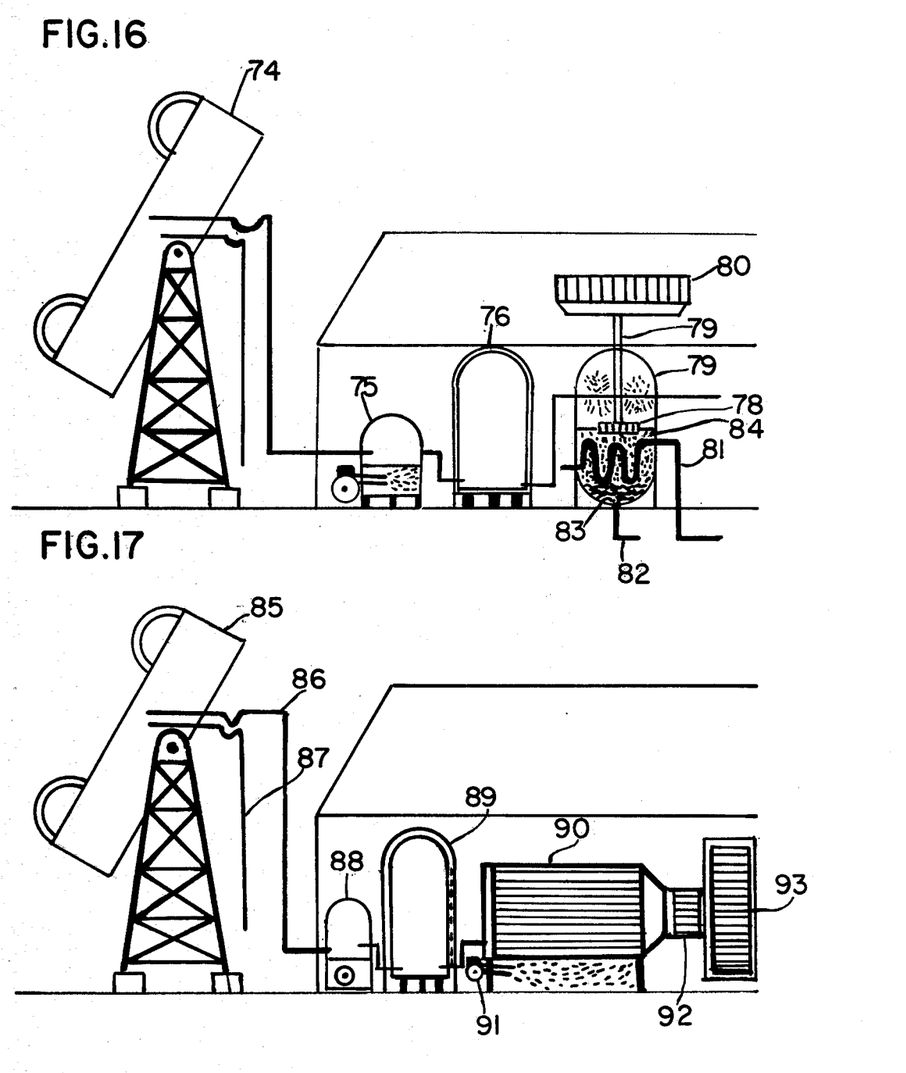
FIG. 16 is a very large solar hot water generating device that is creating hot water to supply hot water in a vacuum tank that is constructed in such a way creates a steam at low temperature due to the fact that water boils quicker in a vacuum. Hot water in conjunction with a cold water coil in bottom of vacuum tank as illustrated will create a thermocline condition.
FIG. 17 shows a steam electric power plant, water being preheated by solar hot water generating device which will be explained more fully.

Note: When solar hot water device is hooked in series, as mentioned at numeral 85, will create hot water at high temperature.

What is claimed is:

1. A solar hot water generating apparatus comprising:
   a hot water generator core comprising a heat exchanger defining a longitudinally extended fluid passageway, and including fluid storage means located on opposite sides of said core and fluidly connected thereto;
   support means for said generator core to permit said generator core to pivot in a vertical plane;
   means for pivoting said generator core in response to the change of direction of the sun, said pivoting means comprising actuating means mechanically connected to said generator core to cause the pivoting movement thereof, and automatic switching means associated with said actuating means, said switching means adapted to control the operation of said actuating means in response to the movement of the sun;
   hot water storage means fluidly connected to the generator core and removed therefrom, said hot water storage means having an inner fluid container thermally insulated from external ambient atmospheric conditions; and,
   a fluid conduit means connecting said generator core to said storage means, and to a water supply, said fluid conduit means including a plurality of reversible check valves provided adjacent said generator core, to reverse the flow of hot water through said generator core as said core changes its position in response to the movement of the sun.

2. The apparatus of claim 1 wherein said generator core comprises:

a length of thermally conductive tubing, said tubing provided to define a plurality of approximately parallel channels disposed in side-by-side relation to each other;

paired generator core holding tanks disposed in parallel relation to each other and to the longitudinal direction of said channels, said tanks fluidly connected to said tubing and to each other, and provided for retaining a quantity of said water adjacent said heat exchanger and permitting said water to recirculate through said heat exchanger;

an enclosure means comprising at least one wall extending to surround said heat exchanger and said holding tanks, and a bottom extending along the broad surface of said heat exchanger and said tanks distal to the sun, said bottom having on the inner surface thereof a reflector means adapted to direct the rays of the sun against the surface of said heat exchanger and said tanks located away from direct sunlight; and, fin means comprising a plurality of oppositely extending fin pairs radiating from said channels, each fin pair cooperating to define an acute angle in the direction of said reflector means, said fin means provided to increase the surface area for absorption of said thermal values.

3. The apparatus of claim 2 wherein said reflector means extends along said wall adjacent said holding tank, and said core further includes transparent cover means adapted to be sealably connected to said wall at the free edges thereof to fully enclose said heat exchanger and said holding tanks.

4. The apparatus of claim 1 wherein said support means comprises an A-frame structure adapted to receive said generator core and defining a pivot axis located in the horizontal plane.

5. The apparatus of claim 1 wherein said pivoting means is connected between said generator core and said support means, said actuating means comprises an electric motor, and said switching means comprises an electric timer adapted for incremental actuation of said motor, including motor reversing means for reversing the direction of rotation of said motor to return said generator core from one end of its pivot arc to the other.

6. The apparatus of claim 1 wherein said hot water storage means comprises a storage tank defining a thermal-break vacuum insulation between said inner fluid container and the external ambient atmosphere.

7. The apparatus of claim 1 wherein said conduit means includes a plurality of gravity-responsive check valves adjacent said generator core, and a plurality of pressure-responsive spring loaded valves adapted for in-line flow control of said conduits.

8. The apparatus of claim 1 further including an auxiliary hot water heat fluidly connected between said generator core and said hot water storage means, said auxiliary hot water heater adapted to serve as a supplementary heat source.

9. A generator core for use in a solar hot water heating apparatus comprising:

a heat exchanger defining a plurality of fluidly connected, longitudinally aligned fluid passageways, said fluid passageways comprising a length of thermally conductive tubing defining a plurality of channels for collecting rays from the sun and trapping the heat therefrom, said channels being disposed in side-by-side relationship to each other;

separate fluid storage means located on opposite sides of said plurality of fluidly connected, longitudinally aligned fluid passageways and fluidly connected thereto, said fluid storage means comprising paired generator core holding tanks disposed in parallel relationship to each other and to the longitudinal direction of said channels, said tanks fluidly connected to said tubing and to each other, and provided for retaining a quantity of said water adjacent said generator core and permitting said water to recirculate through said core;

an enclosure means comprising at least one wall extending to surround said heat exchanger and said holding tanks, and a bottom extending under the broad surface of said heat exchanger and behind said tanks, said bottom having on the inner surface thereof reflector means adapted to direct the rays of the sun against the surface of said heat exchanger and said tanks located away from direct sunlight, said reflector means extending along said wall adjacent said holding tanks; said generator core holding tanks located on opposite ends of said enclosure;

fin means comprising a plurality of fin pairs which extend downwardly from said channels toward said bottom, each fin pair cooperating to define an acute angle in the direction of said reflector means, said fin means provided to increase the surface area for absorption of said thermal values so that rays from the sun are caused to be reflected off of said reflector means and strike said fin means causing the heat from said rays to be trapped in said channels; and, transparent cover means adapted to be sealably connected to said wall at the free edges thereof to fully enclose said heat exchanger and said holding tanks.

* * * * *